April 4, 1967 D. E. MORRELL Re. 26,183
[INFLATABLE POULTRY HOUSE] VENTILATED POULTRY HOUSE
Original Filed Nov. 19, 1962
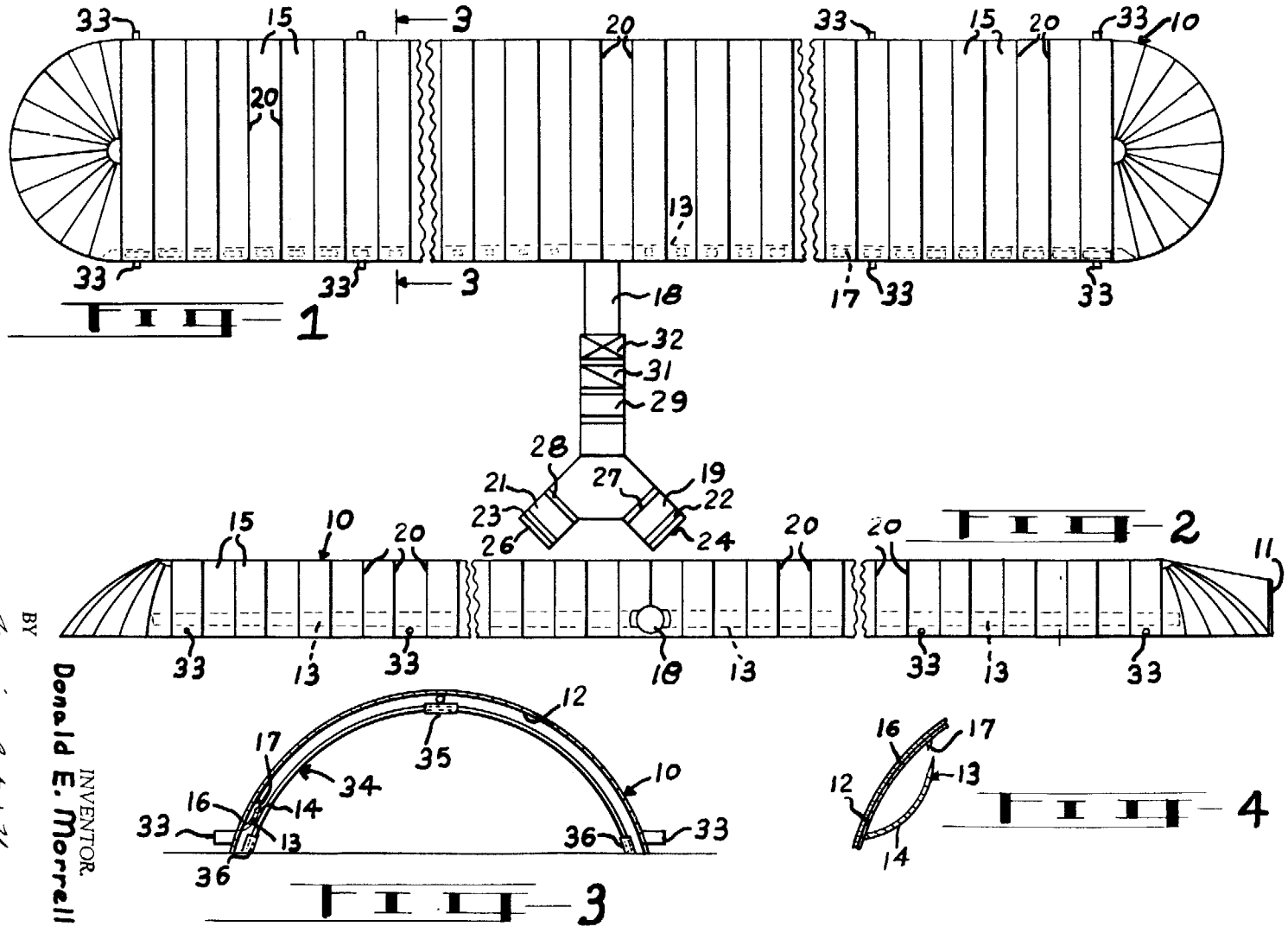
INVENTOR.
Donald E. Morrell
BY
Jennings, Carter & Thompson
Attorneys United States Patent Office Re. 26,183
Reissued Apr. 4, 1967

26,183
[INFLATABLE POULTRY HOUSE]
*VENTILATED POULTRY HOUSE*

Donald E. Morrell, 414 N. 85th St.,
Birmingham, Ala. 35206

Original No. 3,148,662, dated Sept. 15, 1964, Ser. No. 238,362, Nov. 19, 1962. Application for reissue Feb. 21, 1966, Ser. No. 534,277
1 Claim. (Cl. 119—15)

Matter enclosed in heavy brackets [ ] appears in the original patent but forms no part of this reissue specification; matter printed in italics indicates the additions made by reissue.

This invention relates to a *ventilated* poultry house and more particularly to such a house which [shall] *may* be formed of an inflatable material whereby it is supported by positive air pressure therein.

An object of my invention is to provide an elongated [inflatable] shelter having a continuous arcuate inner surface, as viewed in transverse cross section, together with improved means for introducing air continuously throughout the length of the shelter whereby the air moves upwardly along the arcuate surface and then downwardly to be discharged from the shelter.

Another object of my invention is to provide a poultry house of the character designated in which the temperature within the house is uniform throughout, thereby eliminating hot and cold spots and at the same time preventing hot or cold air from being blown directly onto the birds.

Another object of my invention is to provide a poultry house of the character designated which shall include improved means for filtering the air which is continuously introduced into the house, thereby reducing poultry diseases to a minimum and at the same time eliminating the necessity of vaccinating the birds.

Another object of my invention is to provide a poultry house of the character designated in which air under pressure moves continuously across the floor of the house *to ventilate it and* to remove ammonia gases from the litter and then remove the same continuously from the house.

Another object of my invention is to provide a poultry house of the character designated in which the humidity within the house as well as the temperature may be controlled accurately.

Another object of my invention is to provide a poultry house of the character designated in which fumigation gases or liquids may be introduced into the house and removed therefrom through the same means which is employed to supply air continuously to the house, thereby not only facilitating the treatment of the house after a batch of birds have been removed therefrom, but also reducing the usual waiting period required before a new batch of birds are placed in the house.

A further object of my invention is to provide a poultry house of the character designated in which flies and other insects are continuously expelled from the building due to the positive air pressure therein, thereby preventing the spread of diseases to the birds.

A still further object of my invention is to provide a poultry house of the character designated which shall be simple of construction, economical of manufacture and one which provides a healthy atmosphere for growing birds.

Heretofore in the art to which my invention relates various types of poultry houses have been devised. However, with such houses, it is very difficult to control the environment due to the fact that it is not only difficult to maintain uniform temperatures and humidities throughout the building but there is a substantial loss of heated or cooled air due to poor circulation thereof throughout the building.

Briefly, my improved poultry house comprises an elongated [inflatable] shelter having a continuous arcuate inner surface, as viewed in transverse cross section. Air is introduced continuously throughout the length of the building adjacent a side thereof whereby the air flows upwardly around the arcuate surface and then downwardly to be discharged adjacent the floor of the building. Filtering units, heating units, and cooling units are provided to treat the air prior to introduction whereby treated air is continuously introduced into the building.

Apparatus embodying features of my invention is illustrated in the accompanying drawing, forming a part of this application, in which:

FIG. 1 is a top plan view, partly broken away, showing my improved poultry house;

FIG. 2 is a side elevational view, partly broken away, of the apparatus shown in FIG. 1;

FIG. 3 is a sectional view taken generally along the line 3—3 of FIG. 1; and,

FIG. 4 is an enlarged sectional view showing the means for introducing air inwardly of the building.

Referring now to the drawing for a better understanding of my invention, I show an elongated, inflatable shelter 10 which may be formed of a suitable flexible material, such as fabric, plastic or the like. The shelter is provided with a suitable door 11 at one end thereof while the other end thereof is preferably closed. As shown in FIG. 3, the shelter is provided with a continuous, arcuate inner surface 12, as viewed in transverse cross section. That is, the entire inner surface of the elongated shelter 10 is concave as viewed in transverse cross section to provide a continuously curved roof section. The shelter 10 is preferably formed of a plurality of individual sections 15 which are secured to each other as at 20 by suitable means, such as a heat seal or by a suitable adhesive.

Extending substantially the length of one side of the shelter 10 is an elongated conduit 13 which is defined by a curved strip of flexible material 14 and the adjacent portion 16 of the *arcuate* side wall *12* of the shelter 10. That is, the side wall portion 16 defines one side of the conduit 13. A plurality of discharge passageways 17 are provided in the top of the conduit 13 for supplying air inwardly of the shelter 10. As shown in FIG. 1, the passageways 17 are progressively larger toward the ends of the conduit 13 whereby the smaller passageways are toward the center of the shelter 10.

Air is introduced adjacent the center of the elongated conduit 13 by an inlet housing 18. Accordingly, the air flows inwardly adjacent the center of the conduit 13 and then toward the ends thereof. The passageways 17 are thus progressively larger in the direction of air flow. To increase the velocity of the air progressively toward the ends of the conduit 13, the conduit 13 is tapered toward the ends thereof, as shown in FIGS. 1 and 2. By providing the progressively larger passageways 17 in the conduit 13 and by tapering the conduit 13 toward the ends thereof, the amount of air discharged adjacent the ends of the conduit is substantially the same as that discharged adjacent the center of the conduit.

Air under pressure is supplied to the inlet conduit 18 selectively by a power operated fan unit 19 and a power operated fan unit 21. Preferably, the fan unit 19 is electrically operated and the fan unit 21 is a stand-by unit driven by an internal combustion engine. Accordingly, should there be a power failure, the fan unit 19 would stop whereupon the fan unit 21 would be automatically energized. That is, the fan unit 21 might be operatively connected to a pressure sensitive device whereby upon a predetermined decrease in pressure within the conduit 18, the internal combustion engine 21 would be energized. In view of the fact that there are numerous means for energizing one power operated unit when another ceases to operate and in view of the fact that I make no claim to this specific apparatus, no further description thereof is deemed necessary. Air filters 22 and 23 are associated with the fan units 19 and 21, respectively, whereby the incoming air is filtered. Back draft dampers 27 and 28 are mounted inwardly of the fan units 19 and 21, respectively, whereby the air flows in a single direction through the conduit 18.

To further filter the incoming air, I provide an electronic filter 29 inwardly of the fan units 19 and 21. Accordingly, all bacteria, germs and other foreign materials are prevented from entering the poultry house, thereby providing fresh, germ-free air to the birds at all times.

To regulate the temperature of the air entering the poultry house through the inlet conduit 18, I provide a cooling unit 31 and a heating unit 32 intermediate the fan units 19 and 21 and the inlet conduit 18. The cooling unit 31 and the heating unit 32 are controlled by a suitable thermostat in a manner well understood in the art whereby the air passing through the conduit is maintained at a predetermined temperature. Also, suitable means may be associated with the cooling and heating units to control the humidity of the air introduced into the poultry house. Since the specific means for controlling the temperature and humidity of the incoming air forms no part of my invention and such apparatus is well-known in the art, no further description thereof is deemed necessary.

A plurality of longitudinally spaced discharge passageways 33 are provided *on the side wall portion* adjacent the lower portion of the poultry house 10 whereby the incoming air discharged through the passageways 17 passes upwardly adjacent the *arcuate* under surface 12 of the shelter and thence downwardly whereupon it moves across the poultry house adjacent the floor to thereby pick up ammonia fumes from the chicken litter thereby not only supplying fresh air uniformly throughout the enclosure, but also continuously removing any gases which are formed within the chicken litter. This continuous movement of air across the floor of the shelter also removes excess moisture from the litter.

To prevent the shelter from collapsing in the event the pressure therein decreases beyond a predetermined amount, I provide arcuate support members 34 which are spaced longitudinally throughout the length of the poultry house. The arcuate support members 34 are in the form of pipe sections connected at the tops thereof by a sleeve 35 and are anchored to suitable sleeve-like members 36 at each side of the poultry house, as shown in FIG. 3. The sleeves 35 are connected to each other by a suitable tubular member which extends the length of the shelter.

From the foregoing description, the operation of my improved poultry house will be readily understood. The usual litter is placed on the floor of the house and the birds are placed therein. Air is supplied continuously through the inlet conduit 18 by the electric fan unit 19 whereupon the air discharged through the passageways 17 passes upwardly above the conduit 13 and then follows the curved contour of the shelter whereby it passes up, over and down and then across the floor of the poultry house. Since the air is directed against the curved inner surface 12 of the poultry house, it continues to follow the internal contour thereof. Also, since the shelter is under pressure, the air stream is held against the curved walls and does not break away until it moves to a point adjacent the floor. Accordingly, the air does not flow downwardly into direct contact with the backs of the birds, but first flows adjacent the curved walls uniformly throughout the entire length of the building, thereby preventing hot and cold spots. Thus uniform movement of the air maintains a uniform temperature throughout the building. In actual practice, I have found that the temperature differential adjacent the top of the shelter and adjacent the floor thereof is approximately 1° F. The air passes across the floor of the shelter and then is discharged through the passageways 33, thereby continuously removing gas and fumes from the litter and concomitantly therewith continuously supplying fresh air to the birds.

From the foregoing, it will be seen that I have devised an improved poultry shelter. By providing a shelter having a continuously curved arcuate inner surface, together with means to supply air uniformly throughout the length of the shelter adjacent one side thereof, the air first follows the internal contour of the shelter and is then distributed uniformly throughout the shelter from end to end whereby there is a continuous agitation or mixing of the air. Accordingly, not only is the temperature uniform throughout the entire shelter but the fresh air continuously introduced is distributed throughout the shelter and at the same time the gases formed in the litter are continuously removed throughout the length of the shelter. By controlling the temperature and humidity of the incoming air and then distributing this air uniformly throughout the entire enclosure, there are no hot or cold spots within the shelter. Furthermore, by providing an air conduit which extends the length of the shelter and tapers in the direction of air flow and one which is provided with upwardly opening discharge passageways which increase in size progressively in the direction of air flow, substantially the same amount of air is continuously discharged throughout the entire length of the building.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

A *ventilated* poultry house comprising, (a) an elongated [inflatable] shelter having a continuous arcuate inner surface as viewed in transverse cross section [and adapted to be supported by positive air pressure within said shelter], (b) an elongated conduit adjacent a side of said shelter and extending substantially the length thereof, (c) means to supply air under pressure to said conduit, (d) there being a plurality of upwardly opening air discharge passageways throughout the length of said conduit of a size and positioned to force air uniformly in an upward direction subjacent said arcuate inner surface and thence downwardly whereupon it moves across the poultry house adjacent the floor thereof whereby [said shelter is supported by] *air is supplied under* positive [air] pressure within said shelter and air is supplied continuously to the poultry within said shelter, (e) and there being air discharge passageways adjacent lower portions of said shelter *side below said conduit* in position to remove air continuously from said shelter after it has moved upwardly and then downwardly subjacent said arcuate inner surface.

References Cited by the Examiner

The following references, cited by the examiner, are of record in the patented file of this patent or the original patent.

(Other references on following page)

UNITED STATES PATENTS

| | | | |
|---|---|---|---|
| 1,050,251 | 1/1913 | Thompson | 119—32 |
| 1,942,765 | 1/1934 | Mott | 119—34 |
| 2,297,150 | 9/1942 | Hunter. | |
| 2,593,029 | 4/1952 | Holdredge | 119—34 |
| 2,753,818 | 7/1956 | Green. | |
| 2,830,606 | 4/1958 | Daugherty | 135—1 |
| 2,852,109 | 9/1958 | Pine | 98—31 X |
| 2,889,763 | 6/1959 | Pine | 98—31 |
| 2,921,592 | 1/1960 | Mackey | 135—1 |

| | | | |
|---|---|---|---|
| 2,938,449 | 5/1960 | Newell et al. | 98—40 |
| 3,039,378 | 6/1962 | Hall | 119—34 X |
| 3,048,094 | 8/1962 | Bailey | 98—33 |
| 3,053,227 | 9/1962 | Mitchell. | |
| 3,059,655 | 10/1962 | Bird. | |
| 3,115,019 | 12/1963 | Rutishauser | 98—40 |
| 3,231,986 | 1/1966 | Touton | 98—31 X |

SAMUEL KOREN, *Primary Examiner.*

ALDRICH F. MEDBERY, *Examiner.*